United States Patent
Tomassi

(10) Patent No.: US 7,493,190 B1
(45) Date of Patent: Feb. 17, 2009

(54) VENDING SYSTEM HAVING BIOMETRIC VERIFICATION PROTOCOLS FOR USER VERIFICATION

(76) Inventor: Robert Tomassi, 3401 Oxford Valley Rd., Apt. L-1, Levittown, PA (US) 19057

( * ) Notice: Subject to any disclaimer, the term of this patent is extended or adjusted under 35 U.S.C. 154(b) by 956 days.

(21) Appl. No.: 10/764,917

(22) Filed: Jan. 26, 2004

Related U.S. Application Data

(63) Continuation-in-part of application No. 10/038,445, filed on Jan. 7, 2002, now Pat. No. 6,711,465.

(51) Int. Cl.
*G06F 17/00* (2006.01)

(52) U.S. Cl. .................. 700/237; 700/231; 700/232; 221/9; 221/13

(58) Field of Classification Search .............. 700/231, 700/236, 237, 244; 235/379, 380, 381, 382; 705/39
See application file for complete search history.

(56) References Cited

U.S. PATENT DOCUMENTS

| | | | | |
|---|---|---|---|---|
| 5,088,586 A | * | 2/1992 | Isobe et al. | 700/237 |
| 5,377,864 A | * | 1/1995 | Blechl et al. | 221/2 |
| 5,722,526 A | * | 3/1998 | Sharrard | 235/381 |
| 6,119,932 A | * | 9/2000 | Maloney et al. | 235/380 |
| 6,148,091 A | * | 11/2000 | DiMaria | 382/115 |
| 6,308,887 B1 | * | 10/2001 | Korman et al. | 235/379 |
| 6,363,299 B1 | * | 3/2002 | Hartsell, Jr. | 700/244 |
| 6,523,741 B1 | * | 2/2003 | DiMaria et al. | 235/375 |
| 6,560,741 B1 | * | 5/2003 | Gerety et al. | 714/752 |
| 6,615,191 B1 | * | 9/2003 | Seeley | 705/54 |

\* cited by examiner

*Primary Examiner*—Patrick H Mackey
*Assistant Examiner*—Michael K Collins
(74) *Attorney, Agent, or Firm*—LaMorte & Associates, P.C.

(57) ABSTRACT

A vending machine system and its associated method of operation. In the vending machine system, customers are provided with identification cards having statistical information regarding the identity of the card owner. Also contained on the card is a digital data code corresponding to a biometric characteristic of the card owner. Vending machines are provided that contain card readers and biometric characteristic scanners. When a customer wants to use the vending machine, that customer inserts their identification card into the vending machine. That customer also subjects themselves to a biometric scan from the biometric characteristic verifier contained within the vending machine. The vending machine reads both the identification data and the biometric characteristic data from the card. A systems processor in the vending machine compares the biometric characteristic data on the identification card with the biometric characteristic data just gathered.

14 Claims, 3 Drawing Sheets

VENDING SYSTEM HAVING BIOMETRIC VERIFICATION PROTOCOLS FOR USER VERIFICATION

RELATED APPLICATIONS

This application is a continuation-in-part of U.S. patent application Ser. No. 10/038,445, filed Jan. 7, 2002 now U.S. Pat. No. 6,711,465 and entitled Vending Machine Having A Biometric verification System For Authorizing The Sale Of Regulated Products.

BACKGROUND OF THE INVENTION

1. Field of the Invention

The present invention relates to vending systems that sell or dispense products directly to the public. More particularly, the present invention relates to vending systems having identification verification capabilities to ensure that the person buying a product from the vending machine is authorized to receive the product.

2. Description of the Prior Art

Vending systems are automated systems that provide a product or service to a customer at the convenience of the customer. Many vending systems, such as vending machines, require that the customer pay a fee. However, other vending systems exist, such as ticket kiosks, that vend once a customer verifies their identity.

Vending systems are popular because of convenience. Vending systems are ready for business at all times of the day and night. Furthermore, vending systems can be placed in remote locations, such as train stations, hotel corridors and the like that are convenient to customers. However, most all vending machines are non-discriminating. That is, the vending machines will sell a product or service to anyone who deposits the required fee or provides a proper identification code. This is fine with vending machines that sell unregulated products such as candy or soda. However, if a vending system is dispensing products, such as pharmaceuticals, airline tickets or the like, vending systems cannot verify that the person receiving the vended product is truly the person is authorized to receive that product.

In the prior art, there have been attempts to change the design of vending systems so that the vending machines can only sell products to authorized customers. Such prior art vending machines are exemplified by U.S. Pat. No. 5,722,526 to Sharrard, entitled, Dispensing Security System For A Vending Machine. In the Sharrard patent, a vending machine is disclosed that validates the identity of a consumer through an identification card. The identification card is inserted into the vending machine. If the identification card indicates that the customer is of legal age, the vending machine will vend the regulated product.

Such vending machines have not become successful because of the obvious flaw in the verification system. Any person having a valid identification card can use the vending machine. Accordingly, an underage person can purchase regulated products from a vending machine just by borrowing someone else's card. Since the vending machines verify the card and not the person using the card, the degree of verification is insufficient.

A need therefore exists for a vending system that directly verifies the person using the vending system in a manner that cannot be falsified. This would enable vending machines to vend regulated products directly to customers without the fear of abuse by underage or other unauthorized users. This need is met by the present invention as described and claimed below.

SUMMARY OF THE INVENTION

The present invention is a vending system and its associated method of operation. In the vending system, customers are provided with identification cards. The identification cards can be driver's licenses, bankcards or a specialty vending card. On the identification card is statistical information regarding the identity of the card owner. Also contained on the card is a digital data code corresponding to a biometric characteristic of the card owner.

Vending systems are provided that contain card readers and biometric characteristic scanners. When a customer wants to use the vending system, that customer inserts their identification card into the vending system. That customer also subjects themselves to a biometric scan from the biometric characteristic verifier contained within the vending system.

The vending machine reads both the statistical information from the identification card and the biometric characteristic data. A systems processor in the vending system compares the biometric characteristic data on the identification card with the biometric characteristic data just gathered by the biometric scan of the customer. If the data matches, it can be assumed that the owner of the identification card is using the identification card. If the identification card then indicates that the customer is authorized to receive the vended product, the vending system is enabled and a regulated product can be sold from the vending system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention can be added to any known form of a vending system, such as ticket kiosk at an airport, or an automated order dispensing system at a pharmacy, the present invention is especially well suited for a pay-for-service vending machine. In the embodiment first shown, the present invention is shown as part of a pay-for-service vending machine. Such an embodiment is merely exemplary and it should be understood that the present invention can be embodied in many other forms, depending upon the shape, size and configuration of the product being vended.

Figure 1:
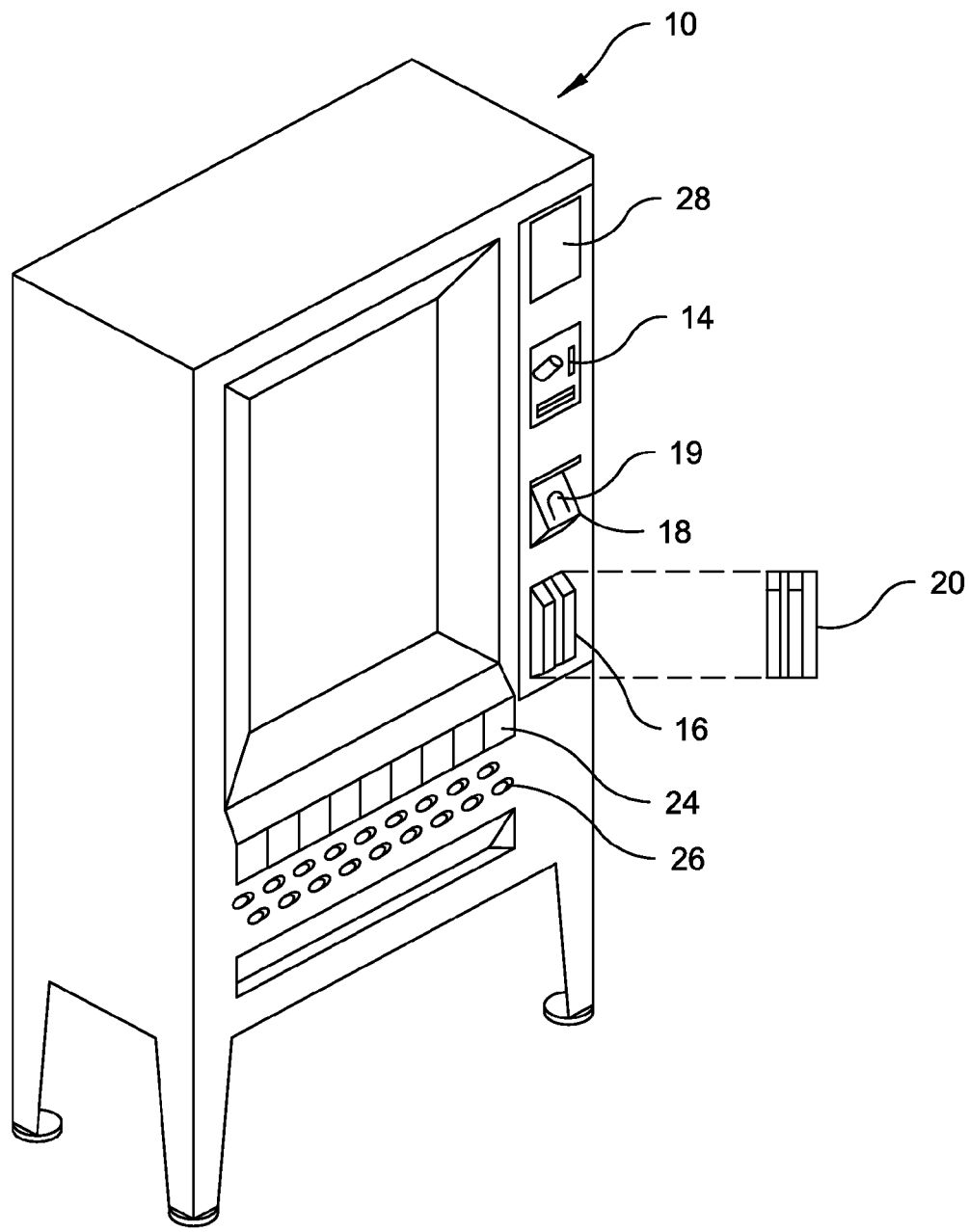
FIG. 1 is a perspective view of an exemplary embodiment of a vending machine in accordance with the present invention.

Referring to FIG. 1, a vending machine 10 is shown that vends a product subject to either state or federal regulations. For instance, the vending machine 10 may vend age sensitive products, such as cigarettes, alcohol, adult entertainment, lottery tickets, movie tickets, concert tickets, spray paint, compact discs, DVD's, software, or any other product that may not be sold to minors or young adults under a pre-described age. The vending machine 10 alternatively may vend products such as travel tickets, pharmaceuticals, hunting permits and like products that can only be sold to authorized purchasers.

The vending machine 10 contains a customer interface 12 that contains three separate components. The first component is a money validation unit 14. The money validation unit 14 can be a coin slot and/or paper money acceptor that receives money and validates the value of the money submitted. Such money validation units are commonplace in most all existing vending machines.

The second component of the customer interface 12 is a card reader 16. The card reader 16 can either be a slot or a swipe path that is capable of reading a digital data code from the magnetic strip of an identification card 20. The identification card 20, as will later be explained is a card that contains both statistical identification parameters and at least one biometric identification parameter specific to the owner of the identification card 20.

The third component of the customer interface 12 is a biometric characteristic verifier 18. The biometric characteristic verifier 18 can be any device that reads a unique biometric parameter directly from the person using the vending machine. The biometric characteristic verifier 18 illustrated is a fingerprint scanner. The fingerprint scanner has a pad 19 upon which a person places a finger. Once a person places his/her finger on the pad 19, the print on the finger is electronically scanned. Although a fingerprint scanner is illustrated, it should be understood that other biometric characteristic verifiers can be used. Other biometric characteristic verifiers include, but are not limited to, retina scanners, face recognition systems, knuckle scanners, palm scanners, voice print recognition systems and the like. Many such biometric characteristic verifiers exist in the art of biometric identification. Many such biometric characteristic scanners can be adapted for use with the present invention.

A customer is instructed on how to use the vending machine 10 through instructions. The instructions may be printed on the vending machine 10. However, in a preferred embodiment, instructions are provided via an electronic display 28.

In addition to the customer interface 12, the vending machine 10 also includes a product selection display 24 and product selection controls 26. The product selection display 24 identifies the product selection controls 26. A customer uses the product selection controls 26 to select a product from the vending machine 10.

In FIG. 1, an identification card 20 is also shown. The identification card 20 contains two types of information. The first type of information is statistical information about a person, such as name, address, age and the like. The second type of information contained on the identification card 20 is at least one biometric parameter unique to the owner of the card. For instance, the identification card 20 can contain data that represents the fingerprint, retina scan, face recognition scan, or the like of the card owner.

The information stored on the identification card is stored in the form of a digital data code. In this manner, the information cannot be viewed by a casual observer or copies using any print copy techniques.

The identification card 20 can be a custom card produced by a private company, such as a credit card company. However, states, such as the State of Pennsylvania, have announced that they will be adding biometric parameter data to driver's licenses in the future. Any such identification card distributed by the government can also be used.

Figure 2:
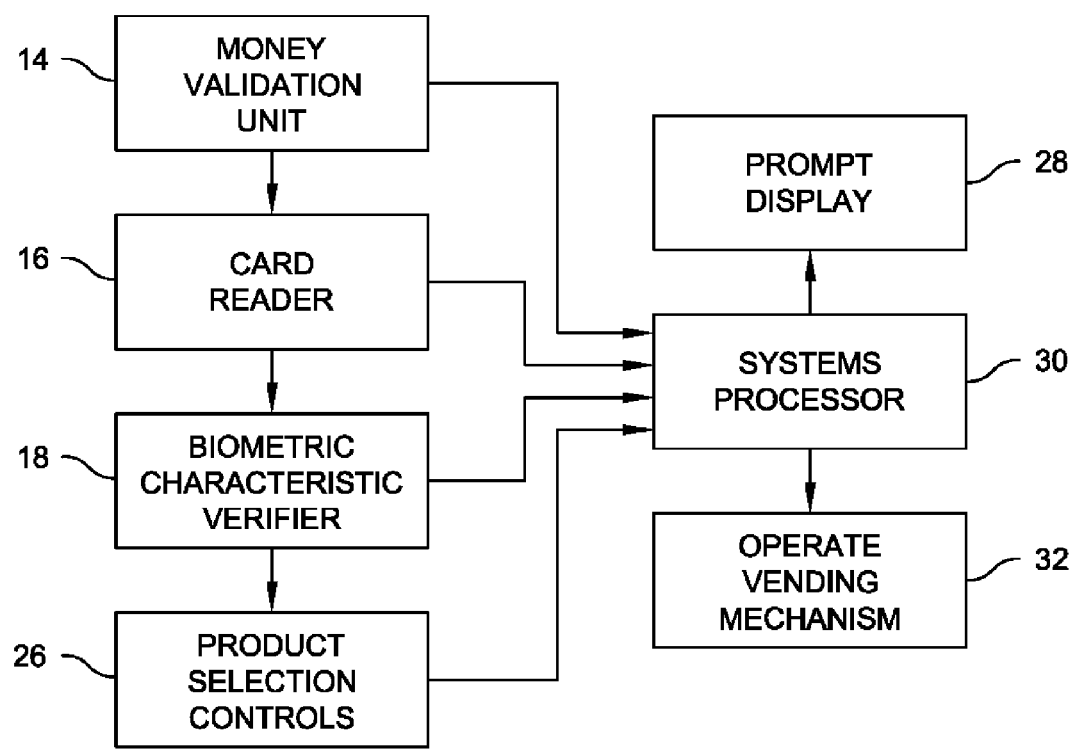
FIG. 2 is a schematic of the logic components of the vending machine.

Referring to FIG. 2, it can be seen that the money validation unit 14, the identification card reader 16, the biometric characteristic verifier 18 and the product selection controls 26 are all interconnected with a systems processor 30. The systems processor 30 is also connected to the various dispensing mechanisms 32 contained within the vending machine and the optional electronic display 28. Before the systems processor 30 activates any of the dispensing mechanisms 32, a proper sequence of events must occur that involves the money validation unit 14, card reader 16, biometric characteristic verifier 18 and product selection controls 26.

Figure 3:
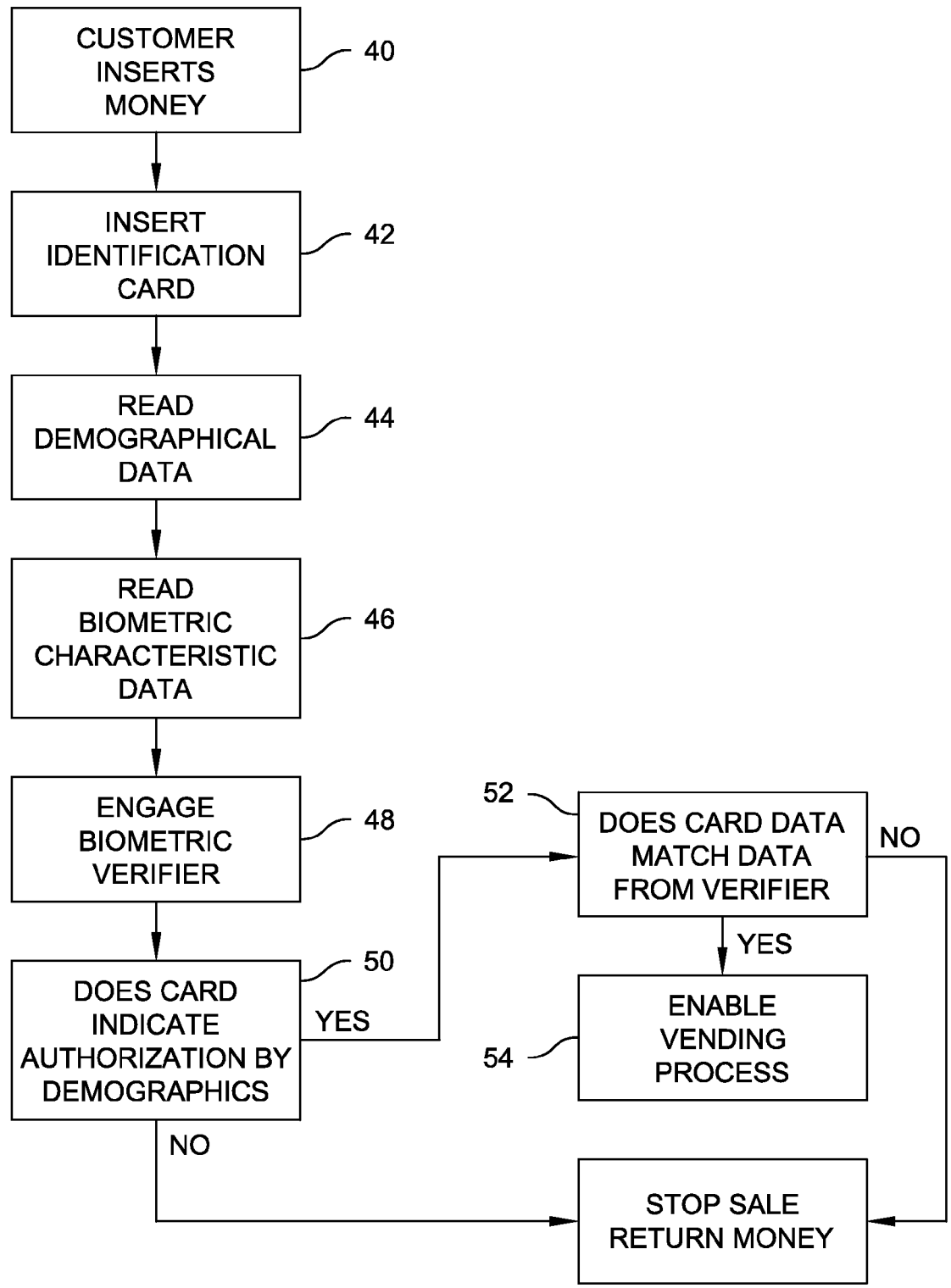
FIG. 3 is a block diagram logic flow illustrating an exemplary method of operation for the present invention.

Referring to FIG. 3, the method of operation for the vending machine system is disclosed. As is indicated by Block 40, a customer first inserts money into the money validation unit 14 (FIG. 1). The amount of money inserted must equal or surpass the price set for the regulated product that is to be sold.

Once the proper fee has been deposited, the customer is prompted to insert their identification card 20 (FIG. 1) into the identification card reader 16 (FIG. 1). This is indicated by Block 42. As shown by Block 44 and Block 46, respectively, the card reader reads the demographic data and the biometric data from the identification card. The demographic data can contain the age of the person as well as other information, such as name, customer number, driver's license number or the like that can be used to identify that person. The biometric data can be any set of data representative of a biometric characteristic. As has been previously mentioned, this can be a fingerprint, voice print, retina scan, face recognition scan or any other unique biometric parameter.

Once the statistical and biometric data is read from the identification card, the person using the vending machine is then prompted to engage the biometric characteristic verifier 18 (FIG. 1) on the vending machine. This step is shown by Block 48. This may include placing a finger on a scan pad, standing still for a face recognition scan or some similar process.

As is indicated by Block 50, the systems processor 30 (FIG. 2) within the vending machine first reads the statistical data gathered from the identification card. If the demographic data indicates that the person is underage or otherwise not authorized for the purchase, the vending machine does not permit the sale and the money is returned.

However, as indicated by Block 52, if the demographic data contained on the identification card does indicate that the sale is permissible, the systems processor then reads the biometric data from the identification card and compares that data to the data collected directly from the biometric characteristic verifier. If the biometric data contained on the identification card matches the data collected directly from the biometric verifier, it is safe to assume that the person who possesses the identification card is the authorized owner of that identification card. As such, the vending machine vends the selected product. See Block 54. However, if the biometric data contained on the identification card does not match the data collected directly from the biometric verifier, it can be assumed that an unauthorized person has possession of another's identification card. The vending machine will then refuse to sell the regulated product.

The present invention vending machine ensures that only authorized persons can purchase products from the vending machine. As such, regulated products can be sold through vending machines without the fear of use from underage or otherwise unauthorized persons.

In the described embodiments that are illustrated, the vending machine is a pay-for-service vending machine where a customer pays money into the vending machine. Other vending systems exist that are not pay-for-service. Rather, the vending systems distribute products that have been prepaid for in a different transaction. For example, ticket kiosks at airports and train stations print tickets that have been prepaid. The user of the vending system need only provide the proper identification that they are the person who has prepaid for the service.

The present invention can be applied to such vending systems. In the application of the present invention, the previously described steps of paying money into the vending system can be eliminated. Rather, the vending system would require the use of an identification card and biometric scanner so that the identity of the user can be confirmed in the same manner as has been previously described.

Thus, it will be understood that the embodiment of the present invention vending system illustrated is only exemplary. There are hundreds of different makes and models of vending systems. Some are pay-for-service, some are not. The present invention verification system can be adapted for use in any such vending system. All such modifications are intended to be included within the scope of the present invention as defined by the appended claims.

What is claimed is:

1. A method of permitting only authorized users to use an automated vending machine, comprising the steps of:
   providing each of the authorized users with an identification card that contains a digital data code corresponding both to the identity of the authorized user and a biometric characteristic of the authorized user;
   providing a vending machine having an identification card reading device and a biometric characteristic scanner;
   reading said digital data code from an identification card inserted into said identification card reading device in said vending machine by a potential user;
   scanning an actual biometric characteristic directly from the potential user using said biometric characteristic scanner;
   comparing the actual biometric characteristic of the potential user to the digital data code of said biometric characteristic contained on said identification card; and
   enabling the vending machine if the actual biometric characteristic of the potential user matches the digital data code of said biometric characteristic contained on said identification card and if said digital data code on said identification card indicates that the potential user is authorized.

2. The method according to claim 1, wherein said biometric characteristic scanner is selected from a group consisting of fingerprint scanners, palm print scanners, retina scanners, knuckle scanners and voice print scanners.

3. The method according to claim 1, further including the step of providing the vending machine with a money validation system for receiving and validating money from the potential user.

4. The method according to claim 3, further including the step of enabling the vending machine only after the potential user has deposited a predetermined fee into said money validation system.

5. The method according to claim 1, wherein said vending machine vends a product that can only be sold to potential users over a predetermined age.

6. The method according to claim 1, wherein said vending machine vends prepurchased products that are to be dispensed only to a potential user who prepurchased the product.

7. A vending machine for vending regulated products, said vending machine comprising:
   a money validation unit for receiving and validating money;
   an identification card reader for reading an identification card;
   a biometric characteristic scanner for reading actual biometric characteristic data from a person standing in front of the vending machine;
   a systems controller for enabling said vending machine to vend the regulated products only after a proper fee has been deposited into the money validation unit and data read from said identification card is matched to said actual biometric characteristic data read by said biometric characteristic scanner.

8. The vending machine according to claim 7, wherein said biometric characteristic scanner is selected from a group consisting of fingerprint scanners, palm print scanners, retina scanners, knuckle scanners and voice recognition scanners.

9. The method according to claim 7, wherein said vending machine vends a product that can only be sold to potential users over a predetermined age.

10. The method according to claim 7, wherein said vending machine vends prepurchased products that are to be dispensed only to a potential user who prepurchased the product.

11. A vending system, comprising:
    identification cards distributed to authorized persons, wherein each identification card contains a digital data code regarding a biometric characteristic that is unique to the owner of that identification card;
    at least one vending machine having a card reader for reading said identification cards and a biometric characteristic scanner for ascertaining an actual biometric characteristic of a person using the vending machine, wherein the vending machine compares the actual biometric characteristic of the person using the vending machine to said digital data code on said identification card and vends product only when there is a match.

12. The system according to claim 11, wherein said biometric characteristic scanner is selected from a group consisting of fingerprint scanners, palm print scanners, retina scanners, knuckle scanners and voice recognition scanners.

13. The system according to claim 11, wherein said vending machine vends a product that can only be sold to potential users over a predetermined age.

14. The system according to claim 11, wherein said vending machine vends prepurchased products that are to be dispensed only to a potential user who prepurchased the product.

* * * * *